US012783598B2

(12) United States Patent
Miandji et al.

(10) Patent No.: US 12,783,598 B2
(45) Date of Patent: Nov. 3, 2026

(54) METHOD, COMPUTER PROGRAM, COMPUTER PROGRAM PRODUCT AND SYSTEM FOR CONFIGURATION OF A SENSOR SYSTEM

(71) Applicant: Sparsit AB, Norrköping (SE)

(72) Inventors: Ehsan Miandji, Norrköping (SE); Saghi Hajisharif, Norrköping (SE); Jonas Unger, Norrköping (SE)

(73) Assignee: Sparsit AB, Norrköping (SE)

( * ) Notice: Subject to any disclaimer, the term of this patent is extended or adjusted under 35 U.S.C. 154(b) by 463 days.

(21) Appl. No.: 18/409,019

(22) Filed: Jan. 10, 2024

(65) Prior Publication Data

US 2024/0241921 A1 Jul. 18, 2024

(30) Foreign Application Priority Data

Jan. 12, 2023 (SE) .................................... 2350023-4

(51) Int. Cl.
*G06F 17/16* (2006.01)
*G06F 18/2136* (2023.01)

(52) U.S. Cl.
CPC .......... *G06F 17/16* (2013.01); *G06F 18/2136* (2023.01)

(58) Field of Classification Search
CPC ........ G06F 17/16; G06F 17/11; G06F 18/214; G06F 18/21345; G06F 18/2136; G06T 9/00; H03M 7/3062; H04N 19/60
See application file for complete search history.

(56) References Cited

U.S. PATENT DOCUMENTS

2017/0360377 A1* 12/2017 Rossi .................. A61B 5/7267
2021/0349945 A1 11/2021 Zhang et al.

FOREIGN PATENT DOCUMENTS

WO WO 2020122800 A1 6/2020
WO WO-2024096765 A1 * 5/2024 ......... H04B 7/06952

OTHER PUBLICATIONS

Office Action for Swedish Application No. 2350023-4, dated Jul. 17, 2023, 11 pages.

(Continued)

*Primary Examiner* — Shefali D Goradia
(74) *Attorney, Agent, or Firm* — ALSTON & BIRD LLP

(57) ABSTRACT

The present disclosure relates to a computer-implemented method for r configuration of a sensor system, said method (500) comprising providing (510,520), for a training dataset X consisting of at least one data element $X_i$, for a measurement of the sensor system (200) relating to an initial set-up of the sensor system (200), a dictionary D forming a signal model comprising at least one basis function and at least one set of sparse coefficients S. Each set of sparse coefficients $S_i$ and the dictionary D represents one of the data elements $X_i$ of said training dataset X. Determining (530) an optimal sub-sampling operator ψ based on the dictionary D and said at least one set of sparse coefficients S, wherein the optimal sub-sampling operator ψ is a selection of a true subset of the sample positions of the training dataset X, wherein the true subset corresponds to the sample positions containing the most important samples of the training dataset X. Configuring (540) the sensor system (200) based on the initial set-up of the sensor system (200) and the optimal sub-sampling operator ψ.

14 Claims, 8 Drawing Sheets

(56) References Cited

OTHER PUBLICATIONS

Ma, Li et al. "Compressive Sensing Solution Optimization Method in Sensing Transmission-Calculation Integrated System", *IEEE.,* 11 pages, Dec. 18, 2022, https://ieeexplore.ieee.org/document/10074852.

Yu, Qi et al., "Dictionary Learning with BLOTLESS Update", *IEEE,* vol. 68, 11 pages, Feb. 06, 2020, https://ieeexplore.ieee.org/document/8985423.

Hong, Tao et al., "Online Learning Sensing Matrix and Sparsifying Dictionary Simultaneously for Compressive Sensing", *Elsevier,* pp. 188-196, May 23, 2018, https://dx.doi.org/10.1016/j.sigpro.2018.05.021.

Bai, Huang et al., "Measurement-Driven Framework with Simultaneous Sensing Matrix and Dictionary Optimization for Compressed Sensing", *IEEE Access,* 14 pages, Feb. 18, 2020, https://dx.doi.org/10.1109/ACCESS.2020.2974927.

* cited by examiner

Fig. 3c

Sensing operator ϕ

| | | |
|---|---|---|
| 1 | 0 | 0 |
| / | / | / |
| 0 | 0 | 1 |

x

Data matrix X

| | | |
|---|---|---|
| 4 | 7 | 5 |
| 3 | 5 | 7 |
| 5 | 5 | 8 |

=

ϕX

| | | |
|---|---|---|
| 4 | 7 | 5 |
| 5 | 5 | 8 |

Sensing operator ϕ

| | | |
|---|---|---|
| 1 | 0 | 0 |
| / | / | / |
| 0 | 0 | 1 |

x

Dictionary D

| | | | | | |
|---|---|---|---|---|---|
| 2 | - | - | - | 1 | - |
| 1 | - | - | - | 1 | - |
| 1 | - | - | - | 2 | - |

x

Sparse coefficient matrix S

| | | |
|---|---|---|
| 1 | 3 | 1 |
| 0 | 0 | 0 |
| 0 | 0 | 0 |
| 0 | 0 | 0 |
| 2 | 2 | 4 |
| 0 | 0 | 0 |

=

ϕD

| | | | | | |
|---|---|---|---|---|---|
| 2 | - | - | - | 1 | - |
| 1 | - | - | - | 2 | - |

x

S

| | | |
|---|---|---|
| 1 | 3 | 1 |
| 0 | 0 | 0 |
| 0 | 0 | 0 |
| 0 | 0 | 0 |
| 2 | 2 | 4 |
| 0 | 0 | 0 |

=

ϕDS

| | | |
|---|---|---|
| 4 | 8 | 5 |
| 5 | 5 | 9 |

METHOD, COMPUTER PROGRAM, COMPUTER PROGRAM PRODUCT AND SYSTEM FOR CONFIGURATION OF A SENSOR SYSTEM

CROSS REFERENCE TO RELATED APPLICATIONS

The present disclosure claims priority to and the benefit of Swedish Application No. 2350023-4, filed Jan. 12, 2023; the contents of which as are hereby incorporated by reference in their entirety.

TECHNICAL FIELD

The present disclosure relates to determining optimal sub-sampling of signals, sensor array optimization, and sampling optimization.

BACKGROUND

Efficient sampling and reconstruction of signals is at the heart of many fields in science and technology, where the goal is to acquire and convert data from the real world, residing in a continuous space, to the digital world, to be processed and analysed by computer programs. A few examples in this direction include medical imaging, radar array systems, wireless communication, industrial inspection, material appearance acquisition, and autonomous systems. The need for high quality data of large quantities is rapidly growing, which outpaces the capabilities of modern sensor systems and the computational power required to capture such data. With the wide-spread utilization of machine learning and artificial intelligence, the gap between the data requirements, in terms of quality and quantity, and the limitations of the sensor systems is expected to increase.

Capturing and storage of data from an array of sensors poses many challenges. Existing solutions and infrastructure require many sensors and high computational demands, leading to a high carbon footprint, increased bandwidth requirements, costly infrastructure, and prohibitively long acquisition time for the system. On the other hand, by reducing the number of sensors, or the sampling frequency and the resolution of each sensor, existing systems cannot achieve desired accuracy when compared to dense arrays of high frequency and resolution. Reduced accuracy in the data hinders various tasks such as recognition and prediction, among other types of data analysis tasks. Moreover, with the advent of machine learning and artificial intelligence, the need for real-time sensor systems, as well as low-powered sensors and sensing systems, is becoming more prevalent, and is expected to increase rapidly in the future.

There is need for improved solutions to reduce the number of sensors and/or samples per measurement for sensor systems.

SUMMARY

One object of the invention is to provide an optimal sub-sampling operator for configuring a sensor system.

This has in accordance with the present disclosure been achieved by means of a computer-implemented method for configuration of a sensor system. Said method comprising:

providing for a training dataset X consisting of at least one data element $X_i$, wherein each data element $X_i$ holds N-dimensional sensor data comprising a measurement from each sensor of the sensor system relating to an initial set-up of the sensor system, a dictionary D forming a signal model comprising at least one basis function, wherein said dictionary D is a matrix or a tensor of at least rank 2, and at least one set of sparse coefficients S, wherein each set of sparse coefficients $S_i$ and the dictionary D represents one of the data elements $X_i$ of said training dataset X, determining an optimal sub-sampling operator ψ based on the dictionary D and said at least one set of sparse coefficients S, wherein the optimal sub-sampling operator ψ is a selection of a true subset of the sample positions of the training dataset X, wherein the true subset corresponds to the sample positions containing the most important samples of the training dataset X, and wherein determining an optimal sub-sampling operator ψ comprises forming a cost function of the difference between S and an inverse or pseudo-inverse of the dictionary D multiplied by Z, wherein Z is the unknown variable corresponding to X, and solving for Z to minimize the cost function $f(S-D^{-1}Z)$ while the number of nonzero rows in Z is at most s, or solving for Z to minimize the number of nonzero rows in Z while the cost function $f(S-D^{-1}Z)$ is at most ε, wherein the optimal sub-sampling operator ψ is based on the resulting Z, and wherein s is the maximum number of sample positions per data element and ε is the maximum error; and configuring the sensor system based on the initial set-up of the sensor system and the optimal sub-sampling operator ψ.

This has the advantage of allowing a sensor system to gather training dataset with a number of samples and a number of sensors to thereafter determine the samples and/or sensors that may be omitted in future measurements while maintaining measurement criteria. This further allows for reduction in hardware cost and system complexity when designing new sensor systems. This further allows for reducing bandwidth requirements in applications where large high-frequency sensor arrays are deployed, and applies to both for designing new sensor systems and optimizing existing sensor systems. This further allows for reduction in processing and storage requirements as the number of samples to process may be significantly decreased.

This further has the advantage of allowing a sensor system to be configured with the minimal number of samples and/or sensors for a set of criteria by utilizing an optimal sub-sampling operator determined based on a determined optimal sensing operator. Solving the problem under the multiple measurement model allows for deriving theoretical error bounds on sensor system performance based on optimized sensing operators, or deriving optimized sensing operators based on user-defined error bounds on system performance. This further has the advantage of providing theoretical guarantees for a solution for subsampling operator optimization, unlike previous approaches to the problem.

In some embodiments, determining an optimal sub-sampling operator ψ is based an optimal sensing operator ϕ when solved for minimizing a cost function $f(\phi X-\phi DS)+(\phi)$, wherein the an optimal sensing operator ϕ represents the most important sample positions within the set of data elements X for the dictionary D, wherein $f(\phi X-\phi DS)$ is a cost function for determining the sensing error and $g(\phi)$ is a cost function related to a number of sample positions per data element $X_i$ or a user defined criteria for ϕ.

This has the advantage of allowing a sensor system to be configured with an optimal sub-sampling operator determined based on a determined optimal sensing operator for cost functions representing user criteria.

In some embodiments, determining the optimal sub-sampling operator ψ comprises solving the following problem:

$$\underset{Z}{\text{minimize}}\ f\left(S - D^{-1}Z\right) \text{ s.t. } \|Z\|_{r0} \leq s$$

wherein s is the maximum number of sample positions per data element $X_i$, wherein $\|Z\|_{r0}$ is the number of sample positions per data element $X_i$, wherein $D^{-1}$ is an inverse or pseudo-inverse of the dictionary D, wherein S is said at least one set of sparse coefficients, wherein Z is the unknown variable that the problem is being solved for that corresponds to X, and wherein the optimal sub-sampling operator ψ is based on the resulting Z, or for multidimensional signals the following matrix optimization problem is solved $$\underset{Z}{\text{minimize}}\ f\left(S_{[3]} - D_3^{-1}Z\right) \text{ s.t. } \|Z\|_{r0} \leq s$$

where $\Sigma_{[3]}$ is the unfolding of the sparse coefficient tensor Σ along the third dimension and $D_3$ is the dictionary for the third dimension, wherein a corresponding problem is solved for each of one or more dimension of the signal.

In some embodiments, determining (530) the optimal sub-sampling operator ψ comprises solving the following matrix optimization problem $$\underset{Z}{\text{minimize}}\ \|Z\|_{r0} \text{ s.t. } f\left(S - D^{-1}Z\right) \leq \varepsilon$$

wherein, given the maximum error ε of the cost function $f$, the number of sample positions per data element $X_i$ is minimized, wherein $\|Z\|_{r0}$ is the number of nonzero rows in Z, wherein $D^{-1}$ is an inverse or pseudo-inverse of the dictionary D, wherein S is said at least one set of sparse coefficients $S_i$, wherein Z is the unknown variable corresponding to X that the problem is being solved for, and wherein the optimal sub-sampling operator ψ is based on the resulting Z.

The present disclosure further relates to a computer program product comprising a non-transitory computer-readable storage medium having thereon a computer program comprising program instructions, the computer program being loadable into a processor and configured to cause the processor to perform the previously disclosed method.

The present disclosure further relates to a device for configuration of a sensor system, said device comprising:

- a processor,
- a memory storage, and
- an interface to the sensor system and/or a user interface,
- wherein said memory storage stores for a training dataset set X comprising at least one data element $X_i$, where each data element $X_i$ holds N-dimensional sensor data comprising a measurement from each sensors of the sensor system relating to an initial set-up of the sensor system,
  - at least one dictionary D each forming a signal model comprising at least one basis function, wherein said dictionary D is a matrix or a tensor of at least rank 2, and
  - at least one set of sparse coefficients S, wherein each set of sparse coefficients $S_i$ and the corresponding dictionary D represents one of the data elements $X_i$ of said training dataset X;
- wherein the processor is arranged to determine an optimal sub-sampling operator ψ based on the at least one dictionary D and said at least one set of sparse coefficients S, wherein the optimal sub-sampling operator ψ is a selection of a true subset of the sample positions of the training dataset X, wherein the true subset corresponds to the sample positions containing the most important samples of the training dataset X, and to determine and communicate via said at least one interface a configuration of the sensor system based on the initial set-up of the sensor system and the optimal sub-sampling operator ψ, and
- wherein determining the optimal sub-sampling operator ψ comprises
  - forming a cost function of the difference between S and an inverse or pseudo-inverse of the dictionary D multiplied by Z, wherein Z is the unknown variable corresponding to X, and
  - solving for Z to minimize the cost function $f(S-D^{-1}Z)$ while the number of nonzero rows in Z is at most s, or solving for Z to minimize the number of nonzero rows in Z while the cost function $f(S-D^{-1}Z)$ is at most ε, wherein the optimal sub-sampling operator ψ is based on the resulting Z, and wherein s is the maximum number of sample positions per data element and ε is the maximum error.

This device has the corresponding advantages of the disclosed method.

In some embodiments, the processor is arranged to send information to the user interface for user-set of at least a part of the determined configuration of the sensor system.

This has the advantage of allowing the user to be presented with information related to the configuration of the sensor system to be performed.

BRIEF DESCRIPTION OF THE DRAWINGS

FIG. 3*a-c* illustrates schematically example signal data, dictionary and sparse coefficient matrices.

DETAILED DESCRIPTION

Figure 1:
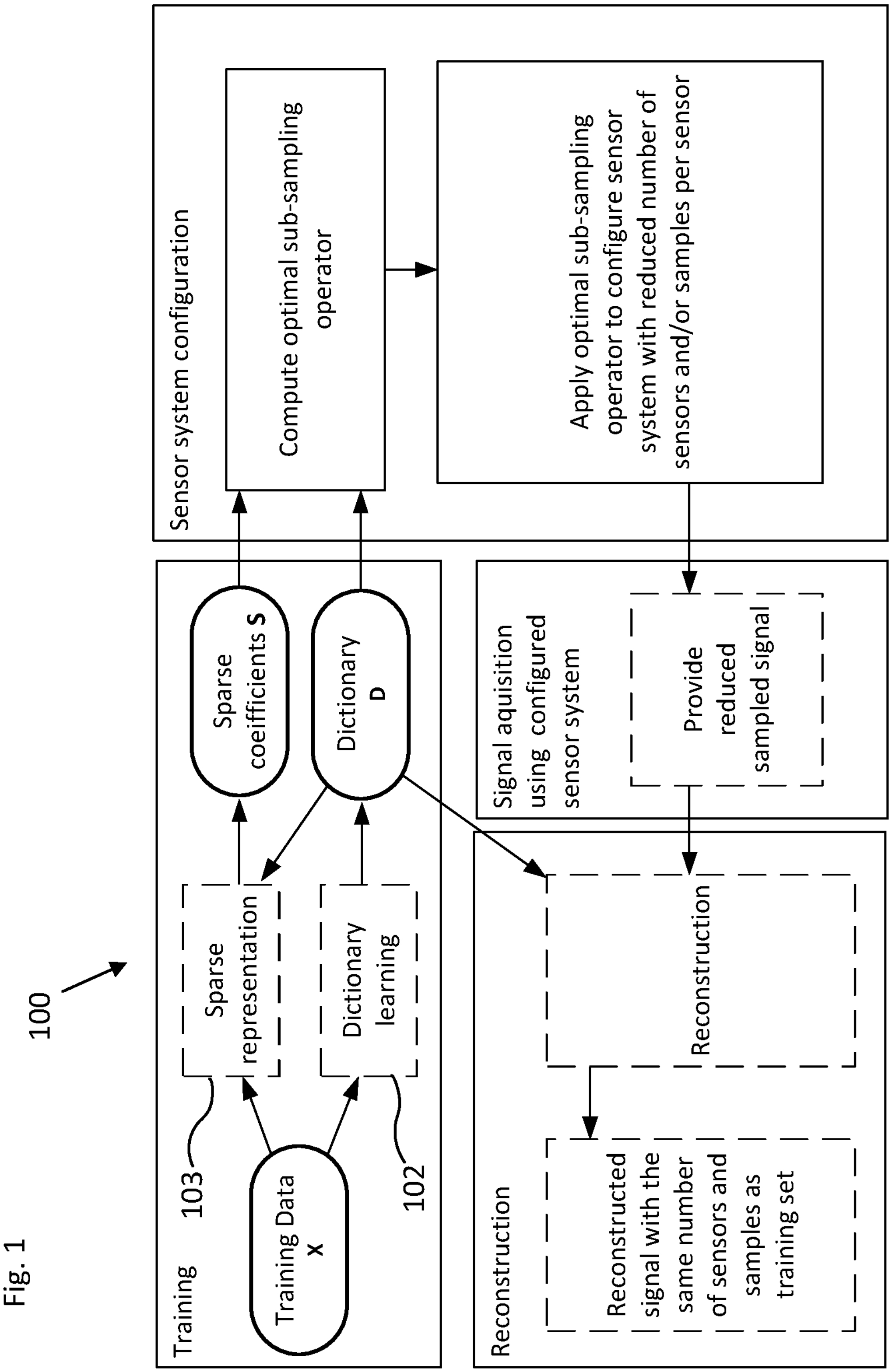
FIG. 1 illustrates an example flowchart for calculating and utilizing an optimal sensing operator.

Throughout the figures, same reference numerals refer to same parts, concepts, and/or elements. Consequently, what will be said regarding a reference numeral in one figure applies equally well to the same reference numeral in other figures unless not explicitly stated otherwise.

Typically, the examples depicted in the figures and represented by equations show data elements $X_i$ as one-dimensional vectors forming datasets X as two-dimensional matrices. It is to be understood that the examples are applicable for corresponding examples with data elements $X_i$ and datasets X of higher dimensionality.

FIG. 1 shows an example flowchart for a method for configuration of a sensor system. The method relates to determining optimal sub-sampling of signal data that is sparse under a dictionary D. From a sensor system a set of training dataset X is provided comprising at least one data element $X_i$ each comprising sensor samples, said sensor system for which determining an optimal sub-sampling is desired. For example, if said method is used for a sensor system with said five antennas with the goal identify which one antenna to remove with minimal reduction in performance, then each data element should comprise samples from all five antennas, typically with samples representing normal operation of the sensor system. Typically, the data elements $X_i$ of the set of training dataset X are of the same format such that they primarily differ in the value of their data elements $X_i$. In the examples data elements $X_i$ are typically vectors with consisting of one or more signal sample values from each sensor, however, data elements $X_i$ may comprise multi-dimensional data, such as consisting of two images captured by two sensors forming a four-dimensional data element $X_i$, where the first three dimensions represent a colour image and the last dimension enumerates the two sensors.

In some examples, the sensors of the sensor system sample sound, visual, lidar, and/or radar signals to form the data elements. It is to be understood that the data elements $X_i$ may comprise any type of sampled signal. Typically, when generating a training dataset X it may be advantageous to use an initial sensor system setup measuring at a relatively high sample rate and/or with a relatively high number of sensors, such that one may expect there to exist samples and/or sensors that can be omitted while fulfilling some measurement criteria. In some examples, the training dataset X is at least partially obtained from a computer simulation of the sensor system, such as a simulation of a dense sensor configuration of said sensor system.

It is to be understood that sub-sampling is a special case of sensing operator optimization. Typically, sub-sampling relates to a technique used in sensing operator optimization to reduce the number of measurements or sensors required to reconstruct a signal. The term optimal sub-sampling relates to an optimal sub-sampling according to some set of boundary conditions, such as minimizing the number of measurements while staying below a minimum reconstruction error. An optimal sub-sampling operator $\psi$ typically indicates which measurements are the most important and which measurements could be omitted.

A dictionary D is determined 102 utilizing said training dataset X comprising the at least one data element $X_i$. Dictionaries D are determined such that the dictionary D and the data elements $X_i$ from the training dataset X may be used to compute a set of sparse coefficients $S_i$ that represent the data element $X_i$. In some examples, determining the dictionary D comprises obtaining a predetermined dictionary and adapting said predetermined dictionary based on the training dataset X comprising data elements $X_i$. Said data elements $X_i$ and the corresponding set of sparse coefficients $S_i$ may be one-dimensional vectors, two-dimensional matrices, or m-dimensional tensors. The training dataset X is typically multiple measurements using one sensor or multiple measurements using multiple sensors, wherein each measurement corresponds to one data element $X_i$. A measurement may comprise sampling a time series of measurement values by one or more sensors. For sensor systems comprising multiple sensors, one measurement from each sensor may be combined into one larger signal comprising the measurement from all sensors combined, with the process repeating for all measurements, such as forming a data element $X_i$ consisting of one vector of signal sample values from vectors from multiple sensors. To combine a measurement from all sensors into a larger signal, e.g. a data element $X_i$, may be performed either by concatenate sensor measurements with preserve dimensionality, or by increasing the dimensionality for the resulting signal. For instance, with a 2D signal matrix from each sensor, then an alternative is to concatenate these matrices along the column dimension to obtain a larger data element $X_i$ matrix, hence preserving the 2D dimensionality. The other alternative is to stack the 2D matrices along the third dimension, hence creating a 3D signal with "sensor ID" as the third dimension. It is to be understood that there is typically some freedom in how to structure a data element into a vector, a matrix or a tensor, and that the trained dictionary D will at least partially have a structure based on the structure of the data element $X_i$.

The trained dictionary D is used to represent 103 training dataset X comprising data elements $X_i$ by at least one set of sparse coefficients S. The term set of sparse coefficients relates to vectors, matrices and tensors wherein a significant fraction of the elements have the value zero. Here data element $X_i$ represents the ith column in training dataset X. Data element $X_i$ is represented by a corresponding set of sparse coefficients $S_i$ via the dictionary D, by $X_i=DS_i$. Typically, each set of sparse coefficients $S_i$ consists of a significant number of zero-valued positions. Set of sparse coefficients $S_i$ may be determined independently for each corresponding data element $X_i$, or may be determined simultaneously as part of the at least one set of sparse coefficients S for the corresponding training dataset X. The training dataset X may thus be utilized to generate a dictionary D and at least one set of sparse coefficients S.

Methods for determining dictionaries D and methods for calculating sets of sparse coefficients S are established in the field. In some examples of the invention, a dictionary D and corresponding sets of sparse coefficients S are obtained as initial inputs used to determine the optimal sub-sampling.

In one example, sparse coefficients have been calculated by solving for at least one set of sparse coefficients S the simultaneous sparse approximation problem, see equation 1, wherein $\varepsilon$ is a maximum error and $\|S\|_{r0}$ is the number of nonzero rows in S which is to be minimized, wherein X−DS is the difference between a data element and the dictionary multiplied by the at least one set of sparse coefficients.

$$\underset{S}{\operatorname{argmin}}\|S\|_{r0} \text{ s.t. } \|X - DS\|_2^2 \leq \varepsilon \tag{1}$$

It is to be understood that based on equation 1, alternatively a sparse approximation may be performed if minimizing for the number of nonzero positions $\|S\|_0$ in S instead of minimizing the number of nonzero rows $\|S\|_{r0}$.

In some examples, each set of sparse coefficients S has been calculated by minimizing a cost function of X−DS for said dictionary D and at least one data element X. In some examples, equation 1 solves for S minimizing a cost function of S.

In some examples, the cost function of the difference X−DS is a linear function or a non-linear function. For example, certain combinations of sample values may be more significant to a user than the individual sample importance, such as two samples from different sensors able to corroborate each other. Herein example data elements $X_i$ are typically vectors, but sparse representation may be defined for vectors, matrices and tensors.

It is to be understood that a plurality of data elements $X_i$ may be stacked in a new dimension, such as data elements $X_i$ that are vectors would stack to form columns of a training dataset X matrix, and correspondingly a sparse coefficient S matrix may be formed for the corresponding sets of sparse coefficients $S_i$, such that equation 1 may be solved for S and X−DS.

In some examples, one or more trained dictionaries D are utilized to, for each dictionary D, represent 103 the training dataset X comprising data elements $X_i$ by corresponding at least one set of sparse coefficients S.

Figure 2:
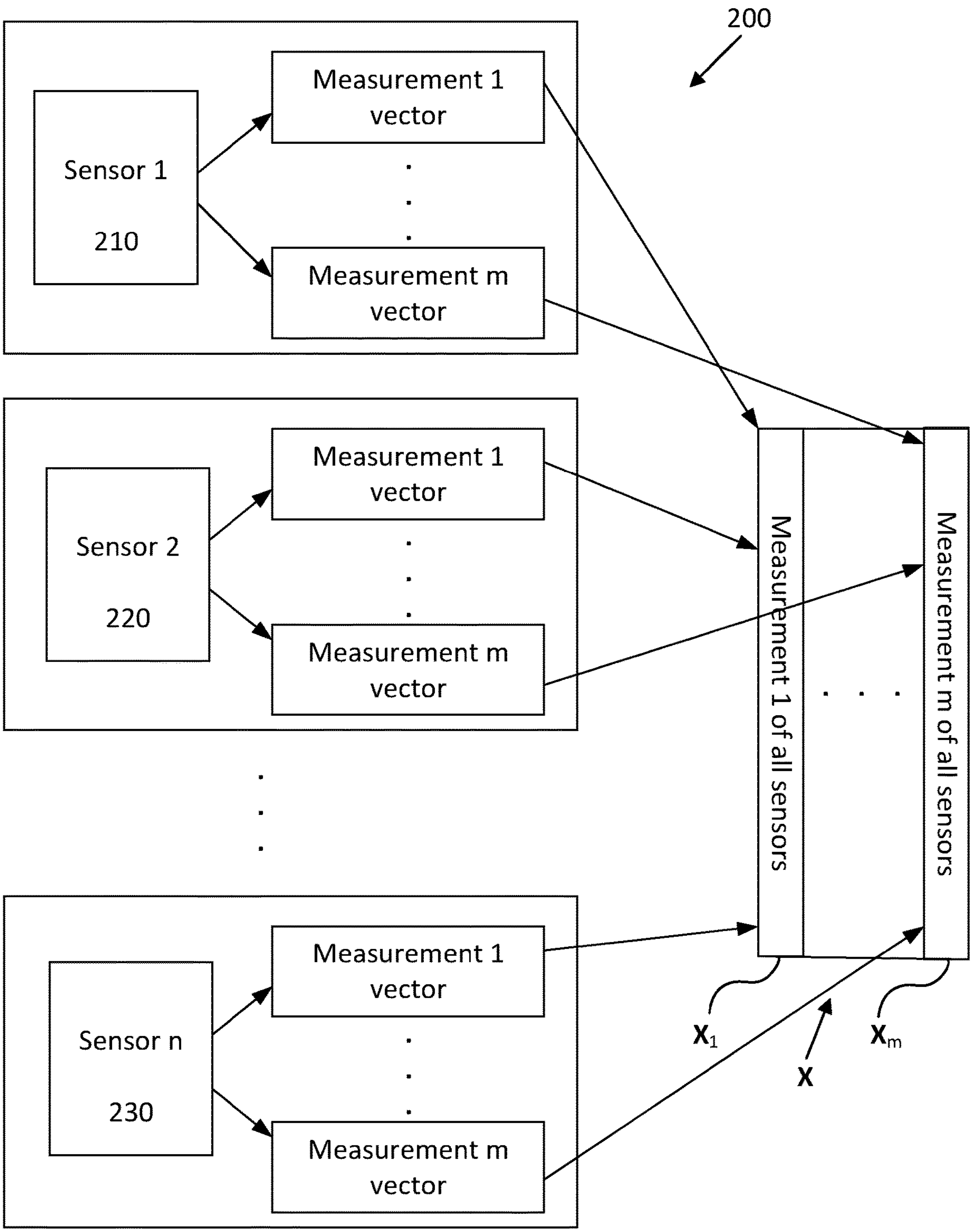
FIG. 2 illustrates schematically an example sensor system performing measurements.

FIG. 2 illustrates schematically an example sensor system 200 performing measurements to construct a dataset comprising data elements. In the example, the sensor system 200 comprises a plurality of sensors 210,220,230 that together perform a collective measurement comprising each sensor sampling a 1D vector of measurement values that is concatenated with the others to form one 1D-vector data element $X_i$ for each measurement. Performing multiple measurements, 1-m, with the sensor system 200 allows formation of a 2D dataset matrix X with the 1D-vector data elements $X_i$ as the columns. The example in FIG. 2 shows a dataset matrix X formed by 1D vector data elements $X_1$ to $X_m$ as its columns. Correspondingly, for a plurality of sensors that sample measurements in 2D the grouping of multiple measurements may result in a 3D dataset. It is to be understood that if in the example in FIG. 2 the measurements values from each sensor were treated as its own data element, instead of being concatenated, then the formed dataset would have the sensor ID as one of the dimensions.

Returning to FIG. 1, the invention relates to the problem of sensing matrix optimization, see equation 2. This is a problem also known as sensing matrix design, or measurement matrix optimization. Typically, the goal when performing sensing matrix optimization is to determine, based on some criteria, the sample element positions in a data element $X_i$ that may be omitted from being sampled while still fulfilling said criteria. The optimal sensing operator $\phi$ samples the rows of the signal matrix X, and the optimal sensing operator $\phi$ is typically solved for in order to determine the relevance of sensors and their measurement samples. Y is the space of all possible sensing matrices with the desired structure. In some examples, Y is the set of all point sampling matrices.

$$\underset{\Phi\in\gamma}{\operatorname{argmin}}\|\Phi X-\Phi DS\|_2^2 \tag{2}$$

The invention is characterized by reformulating the sensing matrix optimization problem of equation 2 into a problem on the form of a sparse representation problem, such as the simultaneous sparse approximation problem in equation 1. The sensing matrix optimization problem is reformulated by inverting the sparse representation of the data matrix, X=DS, which yields $S=D^{-1}X$. It is to be understood that if the dictionary D is not invertible a pseudo inverse, such as $S=D^T(DD^T)^{-1}X$, may be determined. Throughout the examples, the inverse of the dictionary $D^{-1}$ is used in equations and is assumed to exist.

Based on the inverted sparse representation of the data matrix, $S=D^{-1}X$, the problem of finding the optimal point sampling operator is reformulated as equation 3. The problem in equation 3 is to solve for Z to minimize a cost function $f$ of the difference between S and $D^{-1}Z$ and a cost function g of Z. The unknown variable Z represents X, and upon solving for Z, the location of nonzero values in Z represent the optimal sample locations. The cost functions $f$ and/or g may represent a deviation from a desired value, such as a metric of difference between S and $D^{-1}Z$, or a step function having a high value above a maximum desired value. Typically, g(Z) relates to nonzero values or elements in Z.

$$\underset{Z}{\operatorname{argmin}}\, f\left(S-D^{-1}Z\right)+g(Z) \tag{3}$$

Equation 4.1 and 4.2 are two examples of the reformulated problem in equation 3, wherein the cost function $f$ is based on the matrix 2 norm of the difference and calculates an error, ε, and the cost function g is the number of nonzero rows in Z, herein called $\|Z\|_{r0}$. Equation 4.1 is a problem solved by minimizing the error with the condition that the number of nonzero rows in Z is at most equal to s. Equation 4.2 is a problem solved by minimizing the number of nonzero rows in Z with the condition that the error is at most equal to ε. Z represents X but is the unknown variable for which the problems are solved. The error, ε, may be based on a maximum allowed mean-squared-error, signal-to-noise-ratio per sensor, and/or pre-defined sensor properties.

$$\underset{Z}{\operatorname{argmin}}\left\|S-D^{-1}Z\right\|_2^2 \text{ s.t. } \|Z\|_{r0}\le s \tag{4.1}$$

$$\underset{Z}{\operatorname{argmin}}\ \|Z\|_{r0} \text{ s.t. } \left\|S-D^{-1}Z\right\|_2^2\le\varepsilon \tag{4.2}$$

Note that the reformulated sensing matrix optimization problem in equation 4.2 is of the same format as the sparse representation problem in equation 1. The difference being that, in equation 1 the set of sparse coefficients S is unknown and the data matrix X is known, while in equation 3 and 4.1-2 the set of sparse coefficients S is known and the data matrix X is unknown, herein named Z. Upon solving equation 4.1 or 4.2, the zero-rows of the resulting matrix Z are indicative of the least important rows in the data matrix X. Typically, the set of positions corresponding to nonzero values in Z, called supp(Z), is indicative of the optimal sample locations of matrix X. For example, a matrix dataset X as described in FIG. 2 utilizing equation 4.1 or 4.2 may result in a Z that indicates that a number of sample positions in the vector data element $X_i$ should not be sampled in the future, and should no sample positions corresponding to one sensor be sampled then the sensor system may be configured by inactivating or removing said sensor. Computing the optimal sensing operator $\phi$ by reformulating the problem of finding the optimal sampling locations, equation 2, to finding the support of a set of sparse signals under the Multiple Measurement Model (MMV), such as equation 4.2, allows for deriving theoretical error bounds on sensor system performance based on optimized sensing operators, and/or deriving optimized sensing operators based on user-defined error bounds on system performance.

For multidimensional training datasets X, such as tensors, one can solve equation 4.1 or 5 for each dimension individually. For example, with a training dataset tensor $\Xi \in \mathbb{R}^{n\_1 \times n\_2 \times n\_3 \times n\_4}$ and wanting to find the optimal sensing operator for the third dimension. Then solve $$\underset{Z}{\operatorname{argmin}} \|S_{[3]} - D_3^{-1} Z\|_2^2 \text{ s.t. } \|Z\|_{r0} \leq s \tag{5}$$

where $\Sigma_{[3]}$ is the unfolding of the sparse coefficient tensor $\Sigma$ along the third dimension and D3 is the dictionary for the third dimension. This process can be applied for any dimension of the signal.

It is to be understood that the invention and the solved for Z in equation 3 relate to the positions within a data element $X_i$ of the same format as the data elements $X_i$ of the training dataset X used to calculate Z that are expected to contain the most important information according to some criteria, such as s and ε in equation 4.1 and 4.2. For example, a sensor system provides a training dataset X with vector data elements $X_i$ each containing one hundred sample values, and a generated Z may be indicative of sample value positions five, eleven and twenty-five in the vector data elements $X_i$ not being required to be sampled in future measurements by the sensor system.

Existing algorithms for solving the simultaneous sparse approximation problem, such as equation 1, may be readily utilized to solve equation 3 or 4.1-4.2, thereby allowing the sensing matrix optimization problem to be solved utilizing existing tools. It is to be understood that typically there is no need to explicitly calculate Z as only the positions of the nonzero rows of Z are required to find the optimal sensing operator φ of equation 2.

An optimal sensing operator φ may be determined based on Z. In some of these examples, the optimal sensing operator φ is determined based on supp(Z). Typically, supp (Z) defines the optimal sample positions of the data element $X_i$ and the optimal sensing operator φ is arranged to select said optimal sample positions in such data elements $X_i$. The sensor system may be configured based on the optimal sensing operator φ in at least one of at least two ways. Configuring may comprise removing sensors corresponding to the least important positions based on Z, and/or adding sensors at sensors corresponding to the most important positions based on Z. Configuring may comprise instructing at least one sensor to omit at least part of a measurement, and/or to omit sampling data corresponding to at least part of a measurement.

In some examples optimal sensing operator φ is based on at least one of

- a maximum number of samples,
- for each of at least one sensor of the sensor system, a maximum number of samples
- a maximum number of samples and determined and/or estimated signal properties,
- a maximum error threshold, or
- a maximum error threshold and determined and/or estimated signal properties.

In some examples, the sensor data is gathered for storage, and a true subset of the obtained sensor data is stored in a memory storage based on the optimal sensing operator φ. In some examples, the sensor data is gathered for computer processing, and a true subset of the obtained sensor data is processed based on the optimal sensing operator. It is to be understood that the optimal sensing operator may be utilized to reduce the amount of measurements performed, the amount of sampling of measurements, and/or the amount of sampled measurements stored or processed. The desired use of the optimal sensing operator may depend on the application of the sensor system being configured, however, the common factor is to utilize the information of which sensors and samples are expected to be the most and least important for a measurement.

In some examples, an optimal sub-sampling operator ψ is determined based on at least one optimal sensing operator φ. In some examples wherein one optimal sensing operator φ is determined then the one optimal sensing operator φ is the optimal sub-sampling operator ψ. It is to be understood that for some training datasets X and data elements $X_i$ a plurality of optimal sensing operator φ may be determined, such as solving one Z for each of a plurality of dimensions. The term optimal sub-sampling operator ψ relates to an overarching operator for the data element $X_i$ that is determined based on one or more optimal sensing operators φ.

The number of optimal sensing operators φ may be defined by the number of samples, user-defined error threshold ε, or other user-defined signal characteristics. For example, with K dictionaries D, at least K optimal sensing operators φ may be determined, defined over the criteria described above. It should be understood that with more than one dictionary, it is typically not known which optimal sensing operator φ should be used for data elements $X_i$ of an unknown signal to be acquired. In some examples, machine-learning algorithm may be utilized to predict the optimal sensing operator φ given user-defined and/or prior information about the signal, such as recently obtained data elements $X_i$. For a multidimensional training set, an optimal sensing operator may be computed for each dimension, and the number of sample positions may be different each dimension.

Figure 3A:
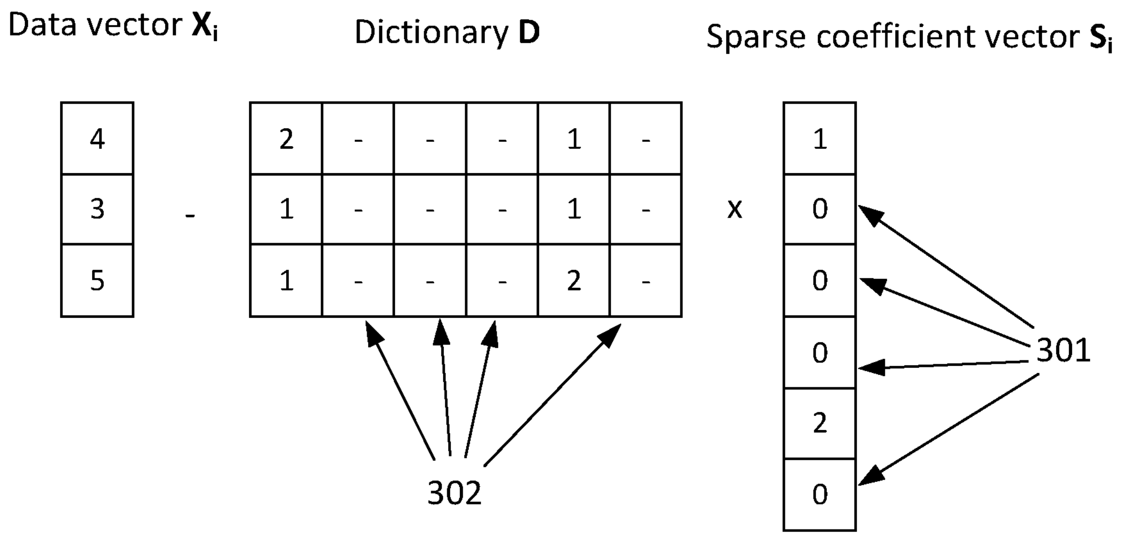
Figure 3B:
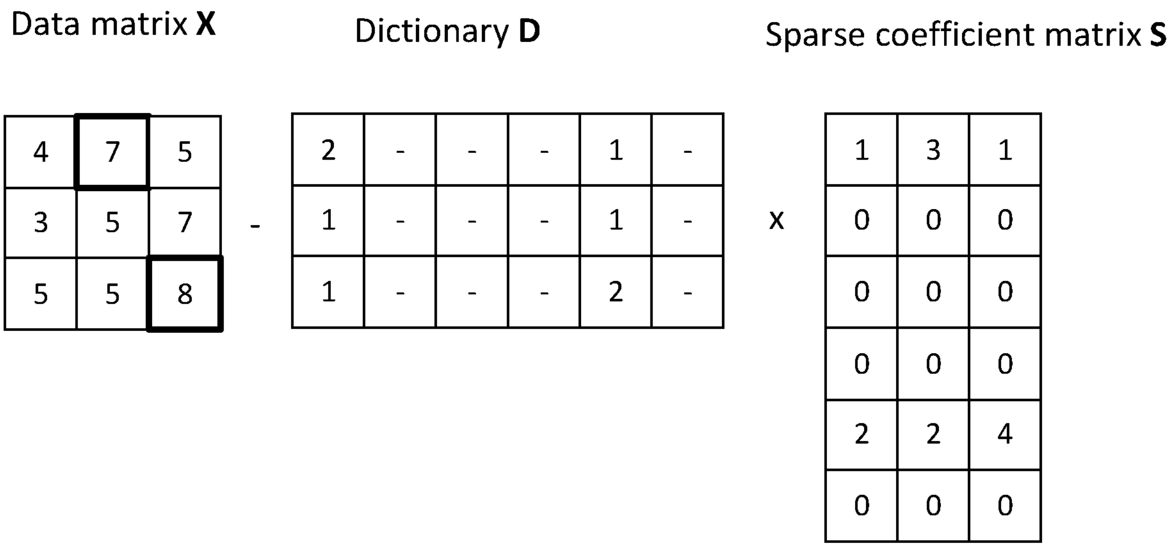

FIG. 3*a-c* illustrates schematically example signal data, dictionaries, sets of sparse coefficients and a sampling operator. Said figures aim to illustrate some of the terms introduced in equations 1 and 2. The vectors and matrices used are for illustrative purposes and do not represent a typical size of data elements or dictionaries, and element values are shown as integer values for readability.

FIG. 3*a* illustrates schematically a difference between a vector data element $X_i$ and dictionary D multiplied by a set of sparse coefficients $S_i$.

The vector data element $X_i$ typically represents a real or synthetic measurement with a plurality of sample positions, such as the vector data elements $X_1, X_m$ of a sensor system in FIG. 2. In the example of FIG. 3*a*, the data element $X_i$ is a vector with three data elements.

The dictionary D is a matrix with predetermined values, typically selected based on the type of data element $X_i$ the sensor system is arranged to obtain.

The example set of sparse coefficient $S_i$ is a vector and the representation of vector data element $X_i$ via dictionary D. Each set of sparse coefficient $S_i$ may be calculated individually for a corresponding data element $X_i$ by solving a sparse approximation problem. A plurality of sets of sparse coefficients $S_i$ may be calculated together by solving the simultaneous sparse approximation problem, such as seen in equation 1. Typically, the sparse coefficients $S_i$ are calculated to have as many zero-valued elements 301 as possible while causing as small an error as possible. In the example in FIG. 3*a* the dictionary D multiplied with the set of sparse coefficients $S_i$ matches the data vector $X_i$ without error. Typically, for a data vector or a data matrix containing many values it is not to be expected that a set of sparse coefficients exists that can match the data vector or the data matrix without errors.

The locations of the nonzero elements of the sparse coefficients $S_i$ vector define the linear combination of the columns of D that make up the signal $X_i$. In other words, the optimization problem in equation 1 tries to find a subset of the columns of the dictionary D such that the signal $X_i$ is best approximated. The positions of nonzero elements in a sparse coefficients $S_i$ vector is herein called the support. In dictionary $D_1$ the values in columns 302 that correspond to the zero value positions 301 in sparse coefficient vector $S_i$ do not have an impact on the result of the multiplication and in FIG. 3*a-c* these values are represented by "-" for readability.

FIG. 3*b* illustrates schematically a difference between a training dataset X and dictionary D multiplied by sets of sparse coefficients S.

The example in FIG. 3*b* mainly differs from FIG. 3*a* in that the vector data element $X_i$ is replaced with a training dataset X matrix consisting of three vector data elements $X_i$ arranged as columns. Correspondingly the vector of sparse coefficients $S_i$ is replaced with a sparse coefficients S matrix, wherein each column in the sparse coefficients S matrix corresponds to a data element $X_i$ in the training dataset X. Note that, with the addition of two data elements $X_i$, the dictionary D multiplied with the sparse coefficients S matrix differs from the training dataset X with the deviating data element positions of training dataset X marked in bold.

In the example in FIG. 3*b* at least some rows of S are zero, this may indicate that the data elements $X_i$ in the training dataset X have similar sparse representation; which means that the data elements $X_i$ in the training dataset X have a similar structure or properties. The example S in FIG. 3*b* represents a solution for the simultaneous sparse approximation problem in equation 1, for which the number of nonzero valued rows are to be minimized under some criteria.

FIG. 3*c* illustrates schematically a training dataset X and a dictionary D multiplied by sets of sparse coefficients S when both are being operated on by a sensing operator $\phi$. The matrices in FIG. 3*c* correspond to the $\phi X$ and $\phi DS$ from the problem of sensing matrix optimization shown in equation 2.

The optimal sensing operator $\phi$ is typically an operator solved for to find the optimal sub-sampling of the data element $X_i$. In FIG. 3*c* the sensing operator $\phi$ is depicted as a matrix with the second row representing no selection, as indicated by "/". The example sensing operator $\phi$ selects the first and third row of each data element $X_i$ of the training dataset X matrix. Correspondingly, the sensing operator $\phi$ selects the first and third row of the dictionary D. It should be noted that the example sensing operator $\phi$ is for illustrative purposes and may not represent an optimal sensing operator $\phi$ for minimizing a difference between $\phi X$ and $\phi DS$.

Figure 4:
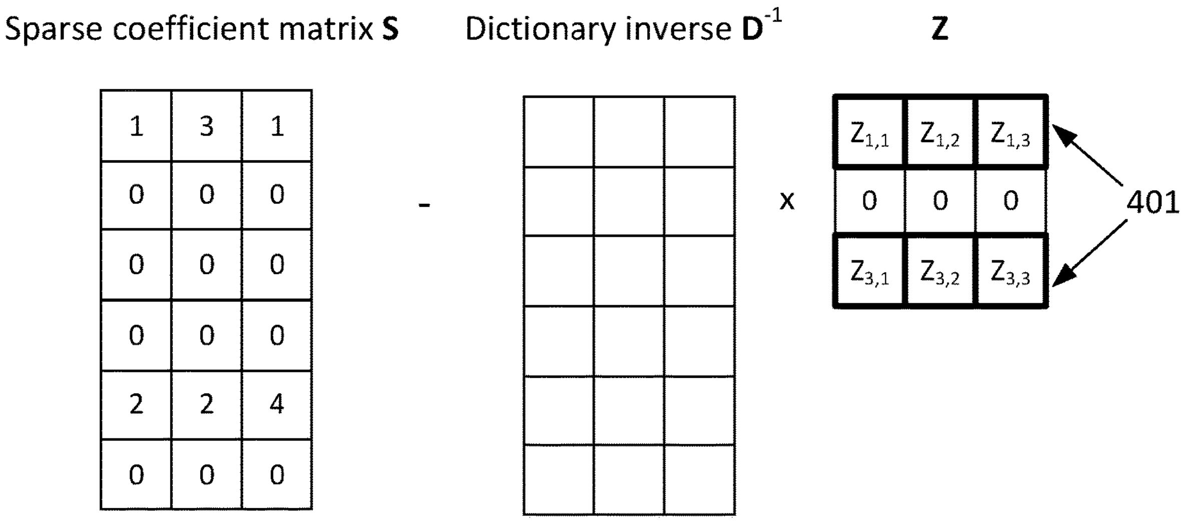

FIG. 4 illustrates schematically a difference between the sparse coefficients S matrix and the inverse directory $D^{-1}$ multiplied by Z. The example matrices in FIG. 4 correspond to the matrices in FIG. 3*c* correspond to the reformulated problem of sensing matrix optimization, $S-D^{-1}Z$, shown in equation 3 and 4.1-2.

The example sparse coefficients S matrix is the same as from FIG. 3*b*. The example inverse directory $D^{-1}$ is an inverse or pseudo-inverse of the dictionary D in FIG. 3*b*, element values not shown. Z is a matrix corresponding to the training dataset X, and is the unknown variable being solved for in equation 3 and 4.1-2. The example in FIG. 4 represents a solution for Z under the condition that at most two rows can be nonzero, thus the first and third row were calculated to be more important rows 401 compared to the second row. FIG. 4 illustrates how solving to represent the sparse coefficients S of a training dataset X via the inverse of a dictionary $D^{-1}$ can allow identification of the most important data elements $X_i$ of said training dataset X.

Returning to FIG. 1, the determined Z, determined optimal sensing operator $\phi$ and/or determined optimal sub-sampling operator $\psi$ may be utilized to configure the sensor system. It is to be understood that the options for configuration may vary based on the sensor system being configured. In some examples, configuring the sensor system comprises removing sensors or redirecting sensors. In some examples, configuring the sensor system comprises controlling the measurements of sensors corresponding to omitting one or more samples. In some examples, configuring the sensor system comprises ignoring at least one sensor sample value from a sensor.

In some examples, configuring the sensor system comprises omitting sensors and/or configuring at least one sensor to perform partial measurements.

In some examples, the determined Z, the optimal sensing operator $\phi$ and/or determined optimal sub-sampling operator $\psi$ is utilized to select a subset of a data element $X_i$ or a representation of said subset of a data element $X_i$ to be stored, and upon reconstruction with the dictionary D form a data element $X_i$ with dimensions corresponding to the original data element $X_i$. The proposed method may be used to reconstructs signals for a dense array of sensors with high sampling rates given signals from a sparse array of sensors at lower sampling rates, and as the sparse coefficients of the signal is reconstructed, the storage costs may be significantly reduced.

Figure 5:
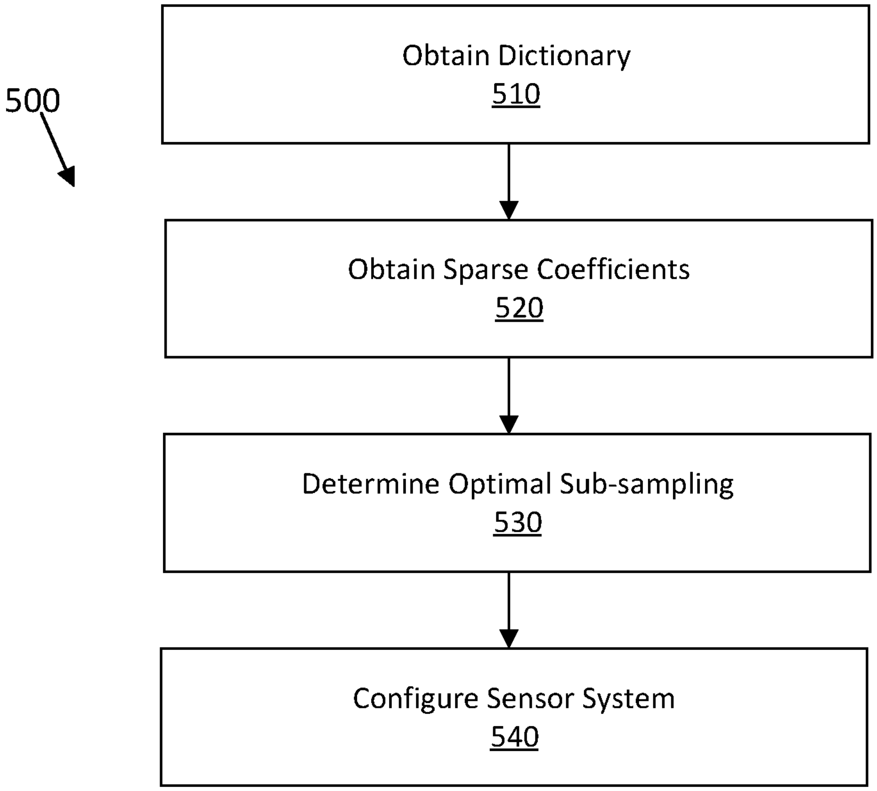
FIG. 5 shows an example method for configuring a sensor system.

FIG. 5 shows a method for configuring a sensor system, said method 500 comprising:

providing 510,520 for a training dataset X consisting of at least one data element $X_i$, wherein each data element $X_i$ holds N-dimensional sensor data comprising a measurement from each sensor of the sensor system relating to an initial set-up of the sensor system, a dictionary D forming a signal model comprising at least one basis function, wherein said dictionary D is a matrix or a tensor of at least rank 2, and at least one set of sparse coefficients S, wherein each set of sparse coefficients $S_i$ and the dictionary D represents one of the data elements $X_i$ of said training dataset X, determining 530 an optimal sub-sampling operator $\psi$ based on the dictionary D and said at least one set of sparse coefficients S, wherein the optimal sub-sampling operator $\psi$ is a selection of a true subset of the sample positions of the training dataset X, wherein the true subset corresponds to the sample positions containing the most important samples of the training dataset X; and configuring 540 the sensor system based on the initial set-up of the sensor system and the optimal sub-sampling operator $\psi$.

The term optimal sub-sampling operator relates to an operator arranged to select positions in a data element format that based on some criteria are the required sample positions, such as the most important sample positions.

In some examples, the configuration 540 of the sensor system comprises configuring the sensor system for sampling and/or storing of data elements $X_i$ of a format corresponding to training dataset X in accordance with the optimal sub-sampling operator $\psi$.

In some of these examples, providing 510,520 for a plurality of training datasets X a plurality of dictionaries D and a corresponding plurality of at least one set of sparse coefficients S; wherein determination 530 of an optimal sub-sampling operator ψ comprises calculating, for each dictionary D, an optimal sub-sampling operator ψ based on the corresponding at least one set of sparse coefficients S; wherein configuring 540 the sensor system for sampling and/or storing of data elements $X_i$ of a format comprises selecting one of the optimal sub-sampling operators ψ based on an estimate of the data element $X_i$ to be obtained. In some of these examples, selecting one of the optimal sub-sampling operators ψ based on an estimate of the data element $X_i$ to be obtained utilizes a machine learning method.

In some of these examples, configuring 540 the sensor system based on the initial set-up of the sensor system and the optimal sub-sampling operator ψ comprises

- calculating a metric for the importance of each sensor, and/or
- calculating a metric for the importance of each sample within each sensor, and/or
- calculating a quality metric for the optimal sub-sampling operator ψ based on a comparison between the optimal sub-sampling operator ψ and the at least one dictionary D.

In some examples, determining 530 an optimal sub-sampling operator ψ is based an optimal sensing operator ϕ when solved for minimizing a cost function $f(\phi X-\phi DS)+g(\phi)$, wherein the an optimal sensing operator ϕ represents the most important sample positions within the set of data elements X for the dictionary D, wherein $f(\phi X-\phi DS)$ is a cost function for determining the sensing error and $g(\phi)$ is a cost function related to a number of sample positions per data element $X_i$ or a user defined criteria for ϕ.

The term optimal sensing operator relates to the most important sample positions for one dimension of a data element. For example, an optimal sensing operator may be determined for each dimension of the data element. In examples with one-dimensional data elements the determined optimal sensing operator may be the optimal sub-sampling operator.

In some examples, cost function $f$ is a norm and/or a weighted norm. The use of weighted norms allows more importance to be assigned to some sensors, or samples within a sensor. The weights may be predefined, or may be determined utilizing a linear function and/or a nonlinear function.

In some examples, cost function g is arranged to return the number of nonzero rows, such as $\|.\|_{r0}$.

In some examples, said at least one set of sparse coefficients S have been calculating by solving a simultaneous sparse approximation problem minimizing $\|S\|_{r0}$. Typically, a solution to a simultaneous sparse approximation problem contains one or more zero-valued rows.

In some examples, determining 530 an optimal sub-sampling operator ψ comprises

- forming a cost function of the difference between S and an inverse or pseudo-inverse of the dictionary D multiplied by Z, wherein Z is the unknown variable corresponding to X, and
- solving for Z to minimize the cost function $f(S-D^{-1}Z)$ while the number of nonzero rows in Z is at most s, or solving for Z to minimize the number of nonzero rows in Z while the cost function $f(S-D^{-1}Z)$ is at most ε, wherein the optimal sub-sampling operator ψ is based on the resulting Z, and wherein s is the maximum number of sample positions per data element and ε is the maximum error.

In some of these examples, the calculation of the optimal sensing operators ϕ comprises utilizing a reformulation of the problem of sensing matrix optimization, wherein Y is the set of all sub-sampling matrices, $$\underset{\phi\in\gamma}{\text{minimize}}\ f(\Phi X-\Phi DS)$$

into the format of the problem of finding a support of a set of sparse signals under the Multiple Measurement Vector model, MMV, $$\underset{S}{\text{minimize}}\ f(X-DS)$$

wherein the reformulated problem is based on a cost function and number of nonzero rows in Z, $$f(S-D^{-1}Z)+\|Z\|_{r0}$$

wherein $D^{-1}$ is an inverse or pseudo-inverse of the dictionary D, and Z is the unknown variable corresponding to X that the reformulated problem is being solved for, and $\|Z\|_{r0}$ corresponds to the number of sample positions per data element $X_i$.

In some of these examples, the data elements $X_i$ holding N-dimensional sensor data comprises a time dimension, and wherein the optimal sensing operator ϕ for a data element $X_i$ at time step t is calculated based on a pool of optimal sensing operators based on at least one optimal sensing operator ϕ from a previous time step, and wherein said pool of optimal sensing operators comprises at least as many optimal sensing operators $\phi_D$ as the number of dictionaries D.

In some examples, one or more true subsets are formed of the at least one set of sparse coefficients S, wherein for each true subset an optimal sensing operators ϕ is determined, and wherein the optimal sub-sampling operator ψ is based on said optimal sensing operators ϕ determined for true subsets. For example the at least one set of sparse coefficients S representing a training dataset X may be split into three parts and an optimal sensing operators ϕ is determined for each part. Splitting into smaller parts may be performed for computional reasons or based on the measurement conditions corresponding to the parts.

In some examples, an optimal sensing operators ϕ is determined for each set of sparse coefficients $S_i$. In some of these examples, the at least one set of sparse coefficients S have been calculated by solving a sparse representation approximation problem for a corresponding training dataset X and a dictionary D.

In some examples, for a plurality of K dictionaries D, at least K optimal sensing operators ϕ may be determined. Assuming a sensor system where the sensor setup may be changed at regular or user-defined time intervals, a machine learning method may be used to predict the optimal sensing operator from the at least K optimal sensing operators ϕ based on previous time intervals and/or user-defined parameters and/or known signal properties and/or user-defined signal properties. The sensor system may be reconfigured using the selected optimal sensing operator ϕ. This process may be repeated at regular or user-defined time intervals.

In some examples, the optimal sub-sampling operator ψ is determined 530 with regard to minimizing the sensing error E, and wherein the optimal sub-sampling operator ψ is further based on:

- a maximum number of sample positions per data element $X_i$, and/or
- an identified set of data element positions to be sampled by the optimal sub-sampling operator ψ, and/or
- an identified set of data element positions to be omitted by the optimal sub-sampling operator ψ.

In some examples, the optimal sub-sampling operator ψ is determined 530 with regards to minimizing the number of sample positions per data element $X_i$, and wherein the optimal sub-sampling operator ψ is further based on:

- a maximum error ε, and/or
- an identified set of data element positions to be sampled by the optimal sub-sampling operator ψ, and/or
- an identified set of data element positions to be omitted by the optimal sub-sampling operator ψ.

In some of these examples, the maximum sensing error ε and/or the number of sample positions per data element $X_i$ is determined based on an estimated noise level in the training dataset X and/or an estimated variance in the training dataset X.

In some examples, determining 530 the optimal sub-sampling operator ψ comprises solving the following problem:

$$\underset{Z}{\text{minimize}}\, f\left(S - D^{-1}Z\right) \text{ s.t. } \|Z\|_{r0} \leq s$$

wherein s is the maximum number of sample positions per data element $X_i$, wherein $\|Z\|_{r0}$ is the number of sample positions per data element $X_i$, wherein $D^{-1}$ is an inverse or pseudo-inverse of the dictionary D, wherein S is said at least one set of sparse coefficients, wherein Z is the unknown variable that the problem is being solved for that corresponds to X, and wherein the optimal sub-sampling operator ψ is based on the resulting Z, or for multidimensional signals the following matrix optimization problem is solved $$\underset{Z}{\text{minimize}}\, f\left(\mathcal{S}_{[3]} - D_3^{-1}Z\right) \text{ s.t. } \|Z\|_{r0} \leq s$$

where $\Sigma_{[3]}$ is the unfolding of the sparse coefficient tensor Σ along the third dimension and $D_3$ is the dictionary for the third dimension, wherein a corresponding problem is solved for each of one or more dimension of the signal.

In some examples, determining 530 the optimal sub-sampling operator ψ comprises solving the following matrix optimization problem $$\underset{Z}{\text{minimize}}\, \|Z\|_{r0} \text{ s.t. } f\left(S - D^{-1}Z\right) \leq \varepsilon$$

wherein, given the maximum error ε of the cost function $f$, the number of sample positions per data element $X_i$ is minimized, wherein $\|Z\|_{r0}$ is the number of nonzero rows in Z, wherein $D^{-1}$ is an inverse or pseudo-inverse of the dictionary D, wherein S is said at least one set of sparse coefficients $S_i$, wherein Z is the unknown variable corresponding to X that the problem is being solved for, and wherein the optimal sub-sampling operator ψ is based on the resulting Z.

In some examples, the configuration 540 of the sensor system comprises configuring sensor system hardware and/or configuring the sensor system to omit performing measurements according to the optimal sub-sampling operator ψ.

In some examples, the configuration 540 of the sensor system comprises configuring the sensor system for sampling and/or storing of data elements $X_i$ of a format corresponding to training dataset X in accordance with the optimal sub-sampling operator ψ.

Figure 6:
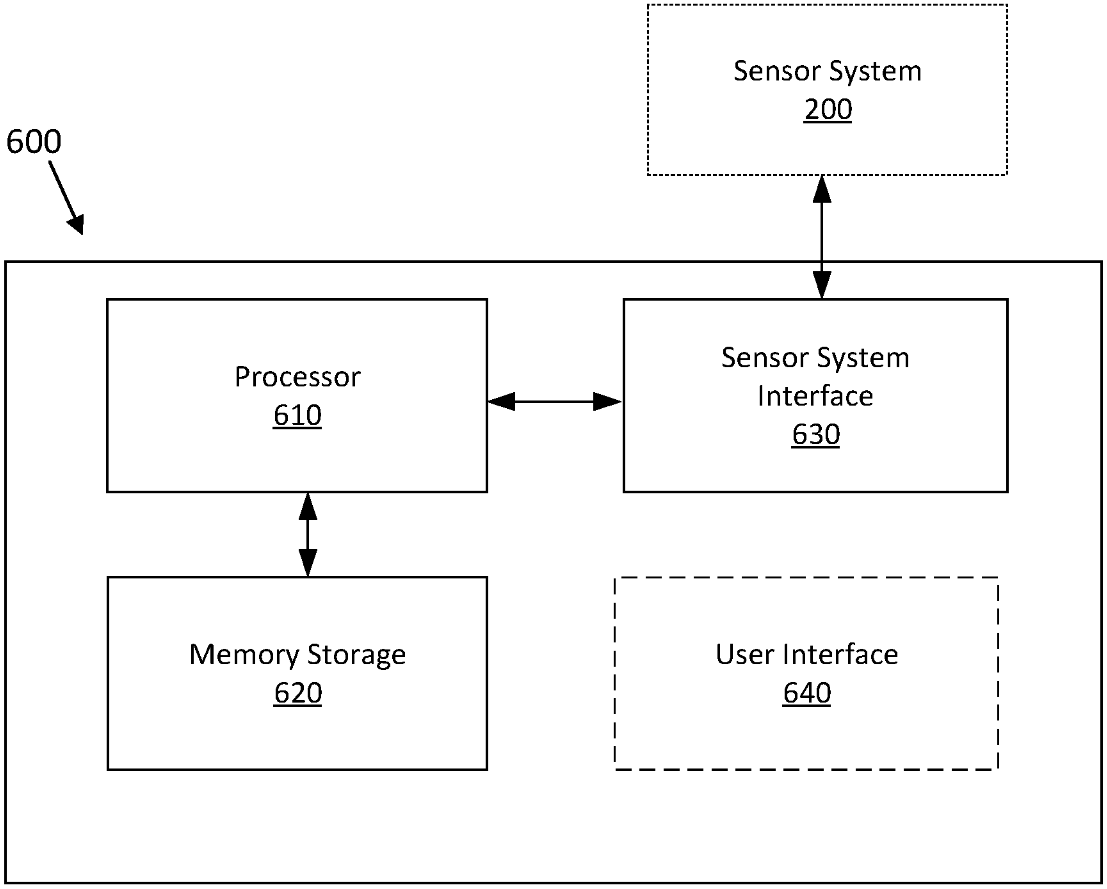
FIG. 6 shows an example device for configuring a sensor system.

FIG. 6 shows a device for configuring a sensor system, said device 600 comprising:

- a processor 610,
- a memory storage 620, and
- an interface to the sensor system 630,
- wherein said memory storage 620 stores for a training dataset set X comprising at least one data element $X_i$, where each data element $X_i$ holds N-dimensional sensor data comprising a measurement from each sensors of the sensor system 200 relating to an initial set-up of the sensor system 200,
  - at least one dictionary D each forming a signal model comprising at least one basis function, wherein said dictionary D is a matrix or a tensor of at least rank 2, and
  - at least one set of sparse coefficients S, wherein each set of sparse coefficients $S_i$ and the corresponding dictionary D represents one of the data elements $X_i$ of said training dataset X;
- wherein the processor 610 is arranged to determine an optimal sub-sampling operator ψ based on the at least one dictionary D and said at least one set of sparse coefficients S, wherein the optimal sub-sampling operator ψ is a selection of a true subset of the sample positions of the training dataset X, wherein the true subset corresponds to the sample positions containing the most important samples of the training dataset X, and to determine and communicate via said interface 630 a configuration of the sensor system based on the initial set-up of the sensor system and the optimal sub-sampling operator ψ.

In some examples, the device 600 is arranged to carry out one or more of the examples of the method 500.

In some examples, the processor 610 is arranged to send information to the interface 630 to the sensor system to at least partly initiate the determined configuration of the sensor system 200.

In some examples, the processor 610 is arranged to send information to the user interface 640 for user-set of at least a part of the determined configuration of the sensor system 200.

In some examples, the device 600 comprises a user interface 640 arranged

- to obtain said dictionary D and/or at least one set of sparse coefficients S, and/or
- to provide said optimal sub-sampling operator ψ to allow a user to at least partially perform said sensor system configuration.

In some of these examples, the processor 610 is arranged to configure a sensor system 200 in a radar application, such as a phased-array radar system.

In some of these examples, the processor 610 is arranged to configure a sensor system 200 for use in a Bidirectional Reflectance Distribution Function, BRDF, acquisition.

In some examples, the device 600 is comprised in a sensor system 200.

Use of the device 600 to render images from a 3D scene offline and/or in real time.

Use of the device 600 to reconfigure medical imaging modalities, such as MRI and CT scanners, in order to reduce imaging time, and/or patient exposure to radiation and harmful contrast agents.

Figure 7:
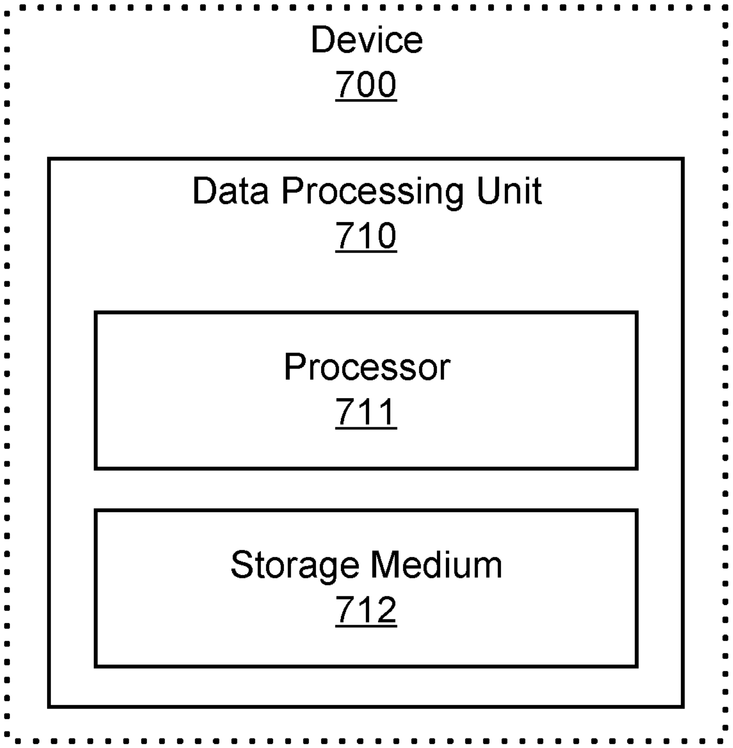
FIG. 7 depicts schematically a data processing unit comprising a computer program product configuring a sensor system.

FIG. 7 depicts schematically a data processing unit comprising a computer program product for configuring a sensor system. FIG. 7 depicts a data processing unit 710 comprising a computer program product comprising a non-transitory computer-readable storage medium 712. The non-transitory computer-readable storage medium 712 having thereon a computer program comprising program instructions. The computer program is loadable into a data processing unit 710 and is configured to cause a processor 711 to carry out the method for configuring a sensor system.

In some examples, the data processing unit 710 is comprised in a device 700. In some of these examples, the device 700 is the device 600 described in FIG. 6.

In some examples, the data processing unit 710 is comprised in a sensor system.

Example of a Real-Time or Offline Rendering Application

In computer graphics, an algorithm called path tracing is employed to render images from a 3D scene. In path tracing, for each pixel a number of rays are generated. This requires us to sample the said pixel to construct rays. Each ray is traced through the scene, resulting in a colour value (called the radiance). The radiance of each ray within a pixel is averaged to obtain the final pixel value. The many sample-per-pixel approach is used to reduce the noise for the final pixel value. Typically, a more sophisticated filtering operation is used, rather than averaging, that may take the samples of neighbouring pixels into account. In practice, for each pixel, hundreds or thousands of samples are computed.

For such a sensor system, the image can be thought of as an array of sensors, where each sensor is a pixel. Moreover, each pixel, equivalently each sensor, captures many samples. When rendering videos, this means that for each frame and for each pixel, many samples are computed. Our method can be utilized here. The training set is a set of images where each pixel contains samples on a regular grid. Once our method is applied, optimal sample locations within all pixels is determined. These sample locations are saved to disk to be used in rendering of new scenes. This procedure can be readily integrated in existing rendering software. Moreover, by defining a user-defined error metric, the number of samples can be optimized. Alternatively, with a user-defined number of samples, the computed sample locations provide the lowest error.

For multiple dictionaries, the auxiliary information contains depth, normals, diffuse-map, or other types of information that the renderer can output with minimal computational cost. Such auxiliary information are used to find the index of the optimal sampling operator for the corresponding image patch.

Example of a Radar Application

The method can be used for phased-array radar systems in such as in autonomous vehicles. New radar systems with minimal number of sensors at low sampling rates may be designed such as to be competitive with dense arrays with high sampling rates. Alternatively, existing systems may be adapted with said method to existing systems to reduce the bandwidth and power consumption. To do this, the optimal sample locations obtained by our method is used to activate only a subset of sensors, where the active sensors have each a lower sampling rate, the sampling rate of each sensor may be different.

The invention claimed is:

1. A computer-implemented method for configuration of a sensor system, said method (500) comprising:

providing (510,520) for a training dataset X consisting of at least one data element $X_i$, wherein each data element $X_i$ holds N-dimensional sensor data comprising a measurement from each sensor of the sensor system (200) relating to an initial set-up of the sensor system (200), a dictionary D forming a signal model comprising at least one basis function, wherein said dictionary D is a matrix or a tensor of at least rank 2, and at least one set of sparse coefficients S, wherein each set of sparse coefficients $S_i$ and the dictionary D represents one of the data elements $X_i$ of said training dataset X, determining (530) an optimal sub-sampling operator ψ based on the dictionary D and said at least one set of sparse coefficients S, wherein the optimal sub-sampling operator ψ is a selection of a true subset of the sample positions of the training dataset X, wherein the true subset corresponds to the sample positions containing retained samples of the training dataset X, and wherein determining (530) an optimal sub-sampling operator ψ comprises:

forming a cost function of the difference between S and an inverse or pseudo-inverse of the dictionary D multiplied by Z, wherein Z is the unknown variable corresponding to X, and solving for Z to minimize the cost function $f(S-D^{-1}Z)$ while the number of nonzero rows in Z is at most s, or solving for Z to minimize the number of nonzero rows in Z while the cost function $f(S-D^{-1}Z)$ is at most ε, wherein the optimal sub-sampling operator ψ is based on the resulting Z, and wherein s is the maximum number of sample positions per data element and ε is the maximum error; and configuring (540) the sensor system (200) based on the initial set-up of the sensor system (200) and the optimal sub-sampling operator ψ.

2. The computer-implemented invention according to claim 1, wherein determining (530) an optimal sub-sampling operator ψ is based an optimal sensing operator φ when solved for minimizing a cost function $f(\varphi X-\varphi DS)+g(\varphi)$, wherein the an optimal sensing operator φ represents retained sample positions within the set of data elements X for the dictionary D, wherein $f(\varphi X-\varphi DS)$ is a cost function for determining the sensing error and $g(\varphi)$ is a cost function related to a number of sample positions per data element $X_i$ or a user defined criteria for φ.

3. The computer-implemented method according to claim 2, wherein the calculation of the optimal sensing operators φ comprises utilizing a reformulation of the problem of sensing matrix optimization, wherein Y is the set of all sub-sampling matrices, $$\underset{\phi\in\gamma}{\text{minimize}}\, f(\Phi X-\Phi DS)$$

into the format of the problem of finding a support of a set of sparse signals under the Multiple Measurement Vector model, MMV, $$\underset{S}{\text{minimize}}\, f(X-DS)$$

wherein the reformulated problem is based on a cost function and number of nonzero rows in Z, $$f(S - D^{-1}Z) + \|Z\|_{r0}$$

wherein $D^{-1}$ is an inverse or pseudo-inverse of the dictionary D, and Z is the unknown variable corresponding to X that the reformulated problem is being solved for, and $\|Z\|_{r0}$ corresponds to the number of sample positions per data element $X_i$.

4. The computer-implemented method according to claim 1, wherein the optimal sub-sampling operator ψ is determined (530) with regard to minimizing the sensing error ε, and wherein the optimal sub-sampling operator ψ is further based on:

a maximum number of sample positions per data element $X_i$, and/or an identified set of data element positions to be sampled by the optimal sub-sampling operator ψ, and/or an identified set of data element positions to be omitted by the optimal sub-sampling operator ψ.

5. The computer-implemented method according to claim 4, wherein the maximum sensing error ε and/or the number of sample positions per data element $X_i$ is determined based on an estimated noise level in the training dataset X and/or an estimated variance in the training dataset X.

6. The computer-implemented method according to claim 1, wherein the optimal sub-sampling operator ψ is determined (530) with regards to minimizing the number of sample positions per data element $X_i$, and wherein the optimal sub-sampling operator ψ is further based on:

a maximum error ε, and/or an identified set of data element positions to be sampled by the optimal sub-sampling operator ψ, and/or an identified set of data element positions to be omitted by the optimal sub-sampling operator ψ.

7. The computer-implemented method according to claim 1, wherein determining (530) the optimal sub-sampling operator ψ comprises solving the following problem:

$$\underset{Z}{\text{minimize}}\, f\left(S - D^{-1}Z\right) \text{ s.t. } \|Z\|_{r0} \leq s$$

wherein s is the maximum number of sample positions per data element $X_i$, wherein $\|Z\|_{r0}$ is the number of sample positions per data element $X_i$, wherein $D^{-1}$ is an inverse or pseudo-inverse of the dictionary D, wherein S is said at least one set of sparse coefficients, wherein Z is the unknown variable that the problem is being solved for that corresponds to X, and wherein the optimal sub-sampling operator ψ is based on the resulting Z, or for multidimensional signals the following matrix optimization problem is solved $$\underset{Z}{\text{minimize}}\, f\left(\mathcal{S}_{[3]} - D_3^{-1}Z\right) \text{ s.t. } \|Z\|_{r0} \leq s$$

where $\mathcal{S}_{[3]}$ is the unfolding of the sparse coefficient tensor $\mathcal{S}$ along the third dimension and $D_3$ is the dictionary for the third dimension, wherein a corresponding problem is solved for each of one or more dimension of the signal.

8. The computer-implemented method according to claim 1, wherein determining (530) the optimal sub-sampling operator ψ comprises solving the following matrix optimization problem $$\underset{Z}{\text{minimize}}\ \|Z\|_{r0} \text{ s.t. } f\left(S - D^{-1}Z\right) \leq \varepsilon$$

wherein, given the maximum error ε of the cost function *f*, the number of sample positions per data element $X_i$ is minimized, wherein $\|Z\|_{r0}$ is the number of nonzero rows in Z, wherein $D^{-1}$ is an inverse or pseudo-inverse of the dictionary D, wherein S is said at least one set of sparse coefficients $S_i$, wherein Z is the unknown variable corresponding to X that the problem is being solved for, and wherein the optimal sub-sampling operator ψ is based on the resulting Z.

9. The computer-implemented method according to claim 1, wherein the configuration (540) of the sensor system (200) comprises configuring sensor system hardware and/or configuring the sensor system (200) to omit performing measurements according to the optimal sub-sampling operator ψ.

10. The computer-implemented method according to claim 1, wherein the configuration (540) of the sensor system (200) comprises configuring the sensor system (200) for sampling and/or storing of data elements $X_i$ of a format corresponding to training dataset X in accordance with the optimal sub-sampling operator ψ.

11. A non-transitory computer-readable storage medium (712) having stored thereon a computer program comprising program instructions, the computer program being loadable into a processor (711) and configured to cause the processor (711) to perform the method (500) for configuring a sensor system (200) according to claim 1.

12. A device for configuration of a sensor system, said device (600) comprising:

a processor (610), a memory storage (620), and an interface to the sensor system (630) and/or a user interface (640), wherein said memory storage (620) stores for a training dataset set X comprising at least one data element $X_i$, where each data element $X_i$ holds N-dimensional sensor data comprising a measurement from each sensors of the sensor system (200) relating to an initial set-up of the sensor system (200), at least one dictionary D each forming a signal model comprising at least one basis function, wherein said dictionary D is a matrix or a tensor of at least rank 2, and at least one set of sparse coefficients S, wherein each set of sparse coefficients $S_i$ and the corresponding dictionary D represents one of the data elements $X_i$ of said training dataset X;

wherein the processor (610) is arranged to determine an optimal sub-sampling operator ψ based on the at least one dictionary D and said at least one set of sparse coefficients S, wherein the optimal sub-sampling operator ψ is a selection of a true subset of the sample positions of the training dataset X, wherein the true subset corresponds to the sample positions containing retained samples of the training dataset X, and to determine and communicate via said at least one interface (630,640) a configuration of the sensor system (200) based on the initial set-up of the sensor system (200) and the optimal sub-sampling operator ψ, and wherein determining the optimal sub-sampling operator ψ comprises:

forming a cost function of the difference between S and an inverse or pseudo-inverse of the dictionary D multiplied by Z, wherein Z is the unknown variable corresponding to X, and solving for Z to minimize the cost function $f(S-D^{-1}Z)$ while the number of nonzero rows in Z is at most s, or solving for Z to minimize the number of nonzero rows in Z while the cost function $f(S-D^{-1}Z)$ is at most ε, wherein the optimal sub-sampling operator ψ is based on the resulting Z, and wherein s is the maximum number of sample positions per data element and ε is the maximum error.

13. The device according to claim 12, wherein the processor (610) is arranged to send information to the interface (630) to the sensor system (200) to at least partly initiate the determined configuration of the sensor system (200).

14. The device according to claim 12, wherein the processor (610) is arranged to send information to the user interface (640) for user-set of at least a part of the determined configuration of the sensor system (200).

* * * * *